(12) United States Patent
Kikuchi

(10) Patent No.: US 9,772,736 B2
(45) Date of Patent: Sep. 26, 2017

(54) TOUCH PANEL

(71) Applicant: FUJITSU COMPONENT LIMITED, Tokyo (JP)

(72) Inventor: Maiko Kikuchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 154 days.

(21) Appl. No.: 14/538,933

(22) Filed: Nov. 12, 2014

(65) Prior Publication Data

US 2015/0199054 A1 Jul. 16, 2015

(30) Foreign Application Priority Data

Jan. 15, 2014 (JP) ................. 2014-005433

(51) Int. Cl.
*G06F 3/045* (2006.01)
*G06F 3/041* (2006.01)

(52) U.S. Cl.
CPC ............ *G06F 3/045* (2013.01); *G06F 3/0418* (2013.01); *G06F 2203/04103* (2013.01); *G06F 2203/04113* (2013.01)

(58) Field of Classification Search
CPC ............ G06F 2203/04107; G06F 3/041–3/047
See application file for complete search history.

(56) References Cited

U.S. PATENT DOCUMENTS 8,587,533 B2* 11/2013 Nishihara ............ G06F 3/0416
345/173
9,285,939 B2* 3/2016 Chang ................. G06F 3/044

2004/0074671 A1* 4/2004 Hirano ................. G06F 3/045
174/267
2004/0095335 A1* 5/2004 Oh ......................... G06F 3/045
345/173
2005/0237439 A1* 10/2005 Mai ........................ G06F 3/045
349/12

(Continued)

FOREIGN PATENT DOCUMENTS

JP 2004-272722 9/2004
JP 2008-293129 12/2008

(Continued)

*Primary Examiner* — Amr Awad
*Assistant Examiner* — Stephen Bray
(74) *Attorney, Agent, or Firm* — IPUSA, PLLC

(57) ABSTRACT

A touch panel includes an upper electrode substrate having a transparent conductive film formed thereon, a lower electrode substrate having a transparent conductive film formed thereon, two electrodes formed on the transparent conductive film of the upper electrode substrate, two electrodes formed on the transparent conductive film of the lower electrode substrate, an adhesive sheet bonding the upper electrode substrate and the lower electrode substrate to each other such that the transparent conductive films face each other, a film removed area formed on the upper electrode substrate by removing part of the transparent conductive film, the film removed area enclosing the two electrodes on the transparent conductive film of the upper electrode substrate, and an outer rim electrode formed on the transparent conductive film of the upper electrode substrate in such a manner as to surround the film removed area, wherein the film removed area forms a closed loop.

6 Claims, 3 Drawing Sheets

(56) References Cited

U.S. PATENT DOCUMENTS

2014/0106579 A1\* 4/2014 Clayton .............. H01R 13/627
                                                      439/67
2015/0015800 A1\* 1/2015 Yang .................... G06F 3/0416
                                                      349/12

FOREIGN PATENT DOCUMENTS

| JP | 2009-048653 | 3/2009 |
| JP | 2010-033316 | 2/2010 |
| JP | 2010-191741 | 9/2010 |
| JP | 2010-218542 | 9/2010 |
| JP | 2012-208750 | 10/2012 |

\* cited by examiner

TOUCH PANEL

BACKGROUND OF THE INVENTION

1. Field of the Invention

The disclosures herein relate to a touch panel.

2. Description of the Related Art

A touch panel (i.e., touchscreen panel) is an input device that allows input to be directly entered into a display, and is generally placed in front of the display. Touch panels are widely used in various applications because of their capability of allowing direct input based on visual information provided by the display.

A resistive-type touch panel is widely known in the art. The resistive-type touch panel includes an upper electrode substrate and a lower electrode substrate having respective transparent conductive films. These substrates are arranged such that the corresponding transparent conductive films face each other. When pressure is applied to a point on the upper electrode substrate, the transparent conductive films are brought into contact with each other, thereby allowing the position of the pressed point to be detected.

The resistive-type touch panel is classified into a four-wire type, a five-wire type, and a diode type. In the four-wire type, an X-axis electrode is disposed on one of the upper electrode substrate and the lower electrode substrate, and a Y-axis electrode is disposed on the other substrate (see Patent Document 1, for example). In the five-wire type, an X-axis electrode and a Y-axis electrode are both disposed on the lower electrode substrate while the upper electrode substrate serves as a probe for detecting voltage (see Patent Document 2, for example).

A touch panel as described above is operated by a finger or the like coming into contact with the touch panel. The finger that is used to operate the touch panel may also come in contact with various other objects. Upon touching an object with static charge, the finger may be charged with static electricity. Operating a touch panel with the finger charged with static electricity results in the static charge of the finger flowing into the touch panel, thereby destroying a semiconductor device such as an integrated circuit chip used in the touch panel. As a result, the touch panel may be broken.

As a preventive measure, an anti-electrostatic sheet may be attached to the surface of a touch panel. Alternatively, the finger may be brought into contact with a highly conductive object prior to operating a touch panel, which serves to remove static charge from the finger. Then, the touch panel may be operated by the use of the finger.

The measures described above are associated with problems. For example, a complex process may become necessary to manufacture the touch panel, resulting in a cost increase. It may otherwise be burdensome to operate a touch panel, and, also, a mistake made with respect to the order of operations may cause the destruction of the touch panel. Further, these measures may not be sufficient as an anti-electrostatic measure.

Accordingly, there may be a need for a touch panel provided with a sufficient anti-electrostatic measure, which neither causes a cost increase nor requires cumbersome operating steps.

[Patent Document 1] Japanese Patent Application Publication No. 2004-272722

[Patent Document 2] Japanese Patent Application Publication No. 2008-293129

[Patent Document 3] Japanese Patent Application Publication No. 2010-218542

[Patent Document 4] Japanese Patent Application Publication No. 2012-208750

SUMMARY OF THE INVENTION

It is a general object of the present invention to provide a touch panel that substantially obviates one or more problems caused by the limitations and disadvantages of the related art.

According to an embodiment, a touch panel includes an upper electrode substrate having a transparent conductive film formed thereon, a lower electrode substrate having a transparent conductive film formed thereon, two electrodes formed on the transparent conductive film of the upper electrode substrate, two electrodes formed on the transparent conductive film of the lower electrode substrate, an adhesive sheet bonding the upper electrode substrate and the lower electrode substrate to each other such that the transparent conductive film of the upper electrode substrate and the transparent conductive film of the lower electrode substrate face each other, a transparent conductive film removed area formed on the upper electrode substrate by removing part of the transparent conductive film of the upper electrode substrate, the transparent conductive film removed area enclosing the two electrodes on the transparent conductive film of the upper electrode substrate, and an outer rim electrode formed on the transparent conductive film of the upper electrode substrate in such a manner as to surround the transparent conductive film removed area, wherein the transparent conductive film removed area forms a closed loop.

According to at least one embodiment, a sufficient anti-electrostatic measure can be taken at low cost.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments will be described by referring to the accompanying drawings. The same or similar elements are referred to by the same or similar numerals.

Figure 1:
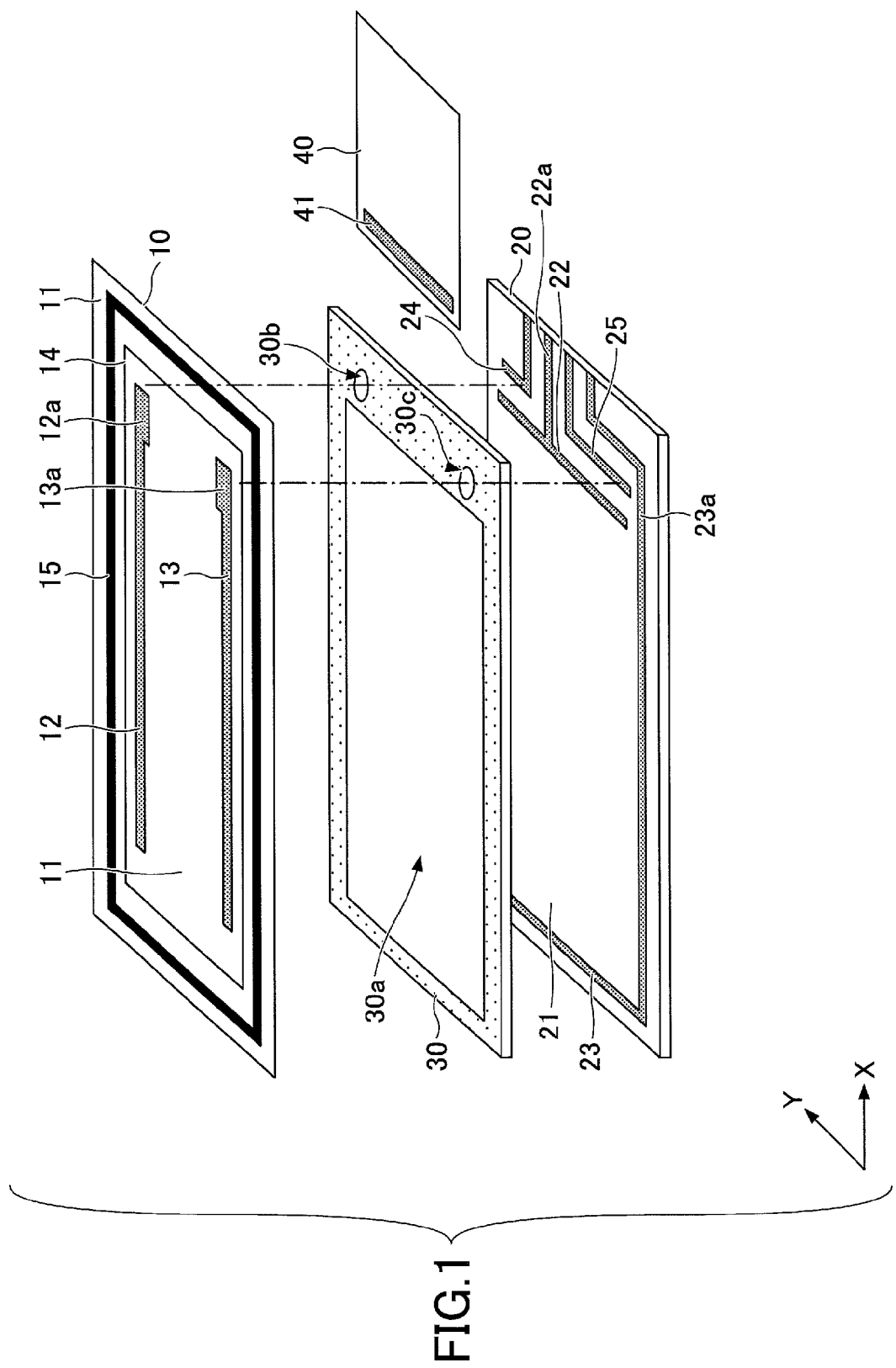
FIG. 1 is an exploded perspective view of a touch panel according to an embodiment.

A four-wire touch panel according to the present embodiment will be described with reference to FIG. 1 and FIG. 2. The touch panel of the present embodiment includes an upper electrode substrate 10, a lower electrode substrate 20, an adhesive sheet 30, and a flexible substrate 40. The upper electrode substrate 10 and the lower electrode substrate 20 have a rectangular shape, and have a size of 15 cm by 20 cm, for example. In FIG. 1 and similar figures, the upper electrode substrate 10 is illustrated as being transparent.

The upper electrode substrate 10 is formed based on a rectangular transparent substrate such as a transparent film or glass. A surface of the upper electrode substrate 10 (i.e., the lower surface in FIG. 1) has a transparent conductive film 11 made of ITO (i.e., tin-doped indium oxide) or the like formed thereon. The transparent conductive film 11 of the upper electrode substrate 10 has two electrodes 12 and 13 formed thereon that extend in the X-axis direction. The electrodes 12 and 13 are formed near the opposite sides, respectively, of the upper electrode substrate 10 extending in the X-axis direction. The two electrodes 12 and 13 are formed by screen printing using silver paste. One end of the electrode 12 has an electrode terminal part 12a formed thereat. One end of the electrode 13 has an electrode terminal part 13a formed thereat. The electrodes 12 and 13 serve to generate a potential distribution in the Y-axis direction on the upper electrode substrate 10, and are also used as a potential detector for the purpose of detecting a coordinate point in the X-axis direction via the transparent conductive film 11.

The transparent conductive film 11 on the upper electrode substrate 10 has a portion thereof removed that is a strip of 1-mm width along the perimeter of a rectangular area enclosing the electrodes 12 and 13. The void generated by such removal constitutes a transparent conductive film removed area 14. The transparent conductive film 11 remains on both the inner side and the outer side of the transparent conductive film removed area 14. The transparent conductive film removed area 14 forms a closed loop that is made by removing the transparent conductive film 11 along the perimeter of the rectangular area enclosing the electrodes 12 and 13. An outer rim electrode 15 is disposed on the transparent conductive film 11 outside the transparent conductive film removed area 14, and has a rectangular shape surrounding the transparent conductive film removed area 14. The outer rim electrode 15 is formed by screen printing using silver paste as a countermeasure against ESD (i.e., electrostatic discharge). In the present embodiment described above, the transparent conductive film removed area 14 forms a closed loop extending along the perimeter of a rectangular area enclosing the two electrodes 12 and 13. The outer rim electrode 15 forms a closed loop having a rectangular shape surrounding the transparent conductive film removed area 14. The transparent conductive film removed area 14 serves to isolate the transparent conductive film 11 inside the transparent conductive film removed area 14 and the transparent conductive film 11 outside the transparent conductive film removed area 14 from each other.

The lower electrode substrate 20 is formed based on a rectangular transparent substrate such as a transparent film or glass. A surface of the lower electrode substrate 20 (i.e., the upper surface in FIG. 1) has a transparent conductive film 21 made of ITO or the like formed thereon. The transparent conductive film 21 of the lower electrode substrate 20 has two electrodes 22 and 23 formed thereon that extend in the Y-axis direction. The electrodes 22 and 23 are formed near the opposite sides, respectively, of the lower electrode substrate 20 extending in the Y-axis direction. The electrodes 22 and 23 are formed by screen printing using silver paste. The electrodes 22 and 23 serve to generate a potential distribution in the X-axis direction on the lower electrode substrate 20, and are also used as a potential detector for the purpose of detecting a coordinate point in the Y-axis direction via the transparent conductive film 21.

The electrode 22 is coupled to an interconnection part 22a that is formed to extend toward one of the two opposite sides of the lower electrode substrate 20 extending in the Y-axis direction. The electrode 23 is connected to an interconnection part 23a that extends, along a side of the lower electrode substrate 20 extending in the X-axis direction, from one of the two opposite sides of the lower electrode substrate 20 extending in the Y-axis direction to the other one of the two opposite sides. The transparent conductive film 21 of the lower electrode substrate 20 has interconnection parts 24 and 25 formed thereon extending toward one of the two opposite sides of the lower electrode substrate 20 extending in the Y-axis direction. The interconnection parts 24 and 25 are coupled to the electrodes 12 and 13, respectively, formed on the upper electrode substrate 10. The interconnection parts 22a, 23a, 24 and 25 are formed by screen printing using silver paste.

The upper electrode substrate 10 and the lower electrode substrate 20 are attached to each other via the adhesive sheet 30 such that the transparent conductive film 11 of the upper electrode substrate 10 and the transparent conductive film 21 of the lower electrode substrate 20 face each other. The adhesive sheet 30 may be a double-faced tape having a thickness of 60 micrometers with adhesive layers formed on both faces thereof, and has a rectangular opening 30a at the center thereof for the purpose of allowing functioning as a touch panel. Through holes 30b and 30c are formed through the adhesive sheet 30 near one of the two opposite sides of the adhesive sheet 30 extending in the Y-axis direction, thereby allowing respective couplings between the electrode terminal parts 12a and 13a of the electrodes 12 and 13 on the upper electrode substrate 10 and the interconnection parts 24 and 25 on the lower electrode substrate 20.

Figure 2:
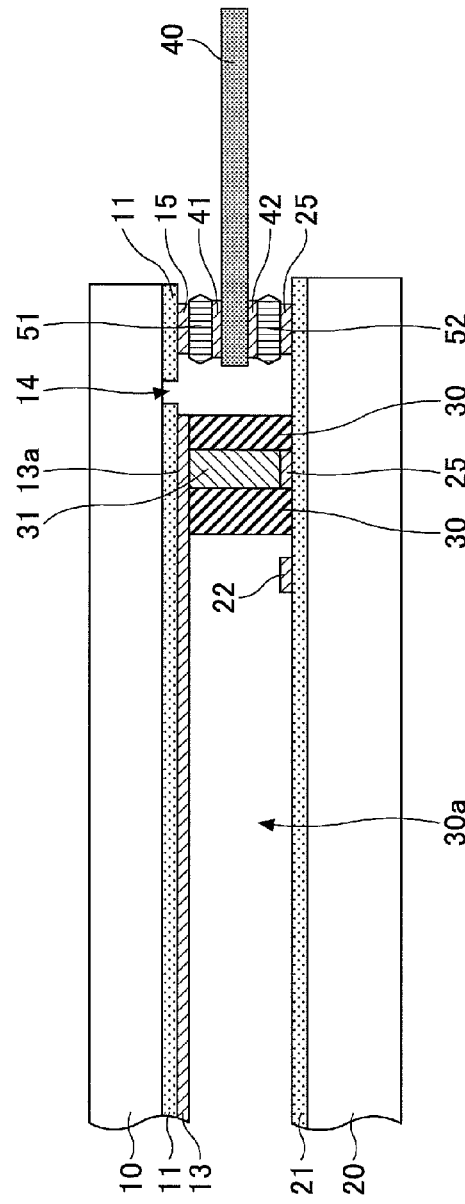
FIG. 2 is a cross-sectional view of the touch panel according to the embodiment.

As illustrated in FIG. 2, the flexible substrate 40 has an electrode terminal 41 formed on a first surface thereof coupled to the outer rim electrode 15 formed on the upper electrode substrate 10, and has a plurality of electrode terminals 42 formed on a second surface thereof coupled to the respective interconnection parts 22a, 23a, 24 and 25 formed on the lower electrode substrate 20. The electrode terminal 41 disposed on the first surface of the flexible substrate 40 and the outer rim electrode 15 disposed on the upper electrode substrate 10 are electrically coupled to each other via an anisotropic conductive film 51. The electrode terminals 42 disposed on the second surface of the flexible substrate 40 and the interconnection parts 22a, 23a, 24 and 25 disposed on the lower electrode substrate 20 are electrically coupled to each other, respectively, via anisotropic conductive films 52.

Further, the electrode terminal part 12a of the electrode 12 disposed on the upper electrode substrate 10 and the interconnection part 24 disposed on the lower electrode substrate 20 are electrically coupled to each other via an electrically conductive adhesive that fills the through hole 30b of the adhesive sheet 30. Similarly, the electrode terminal part 13a of the electrode 13 disposed on the upper electrode substrate 10 and the interconnection part 25 disposed on the lower electrode substrate 20 are electrically coupled to each other via an electrically conductive adhesive 31 that fills the through hole 30c of the adhesive sheet 30. These conductive adhesives serve as electrodes formed inside the through holes 30b and 30c. In the present embodiment, the electrodes formed of the conductive adhesive 31 may sometimes be referred to as through electrodes.

In the present embodiment, the electrode terminal 41 on the first surface of the flexible substrate 40 is electrically coupled to the outer rim electrode 15 formed for anti-ESD purposes. Further, the electrode terminals 42 on the second surface of the flexible substrate 40 are electrically coupled to the interconnection parts 22a, 23a, 24 and 25, respectively.

The interconnection part 22a is part of the electrode 22, and the interconnection part 23a is part of the electrode 23.

A description of the present embodiment has been given with respect to the case in which the conductive adhesive 31 is used. Alternatively, conductive paste containing minute metal particles made of Ag (silver), Au—C (gold-carbon), or the like may be used.

Figure 3:
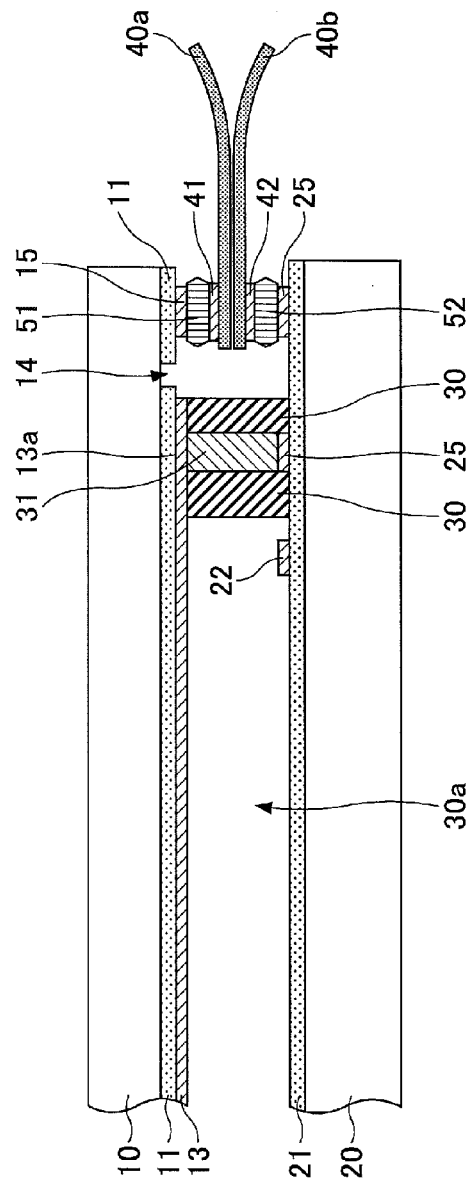
FIG. 3 is a cross-sectional view of a variation of the touch panel according to the embodiment.

The above description has been directed to the case in which the electrode terminal 41 and the electrode terminals 42 are disposed on both surfaces of the flexible substrate 40, respectively. Alternatively, the touch panel of the present embodiment may use two flexible substrates which have one or more electrode terminals formed on only one surface thereof. More specifically, as illustrated in FIG. 3, a flexible substrate 40a having the electrode terminal 41 formed on one surface thereof and a flexible substrate 40b having the electrode terminals 42 formed on one surface thereof may be used. Similarly to the previous case, the electrode terminal 41 formed on the surface of the flexible substrate 40a is electrically coupled to the outer rim electrode 15 via the anisotropic conductive film 51, and the electrode terminals 42 formed on the surface of the flexible substrate 40b are electrically coupled to the interconnection parts 22a, 23a, 24 and 25 via the anisotropic conductive films 52, respectively.

Figure 4A:
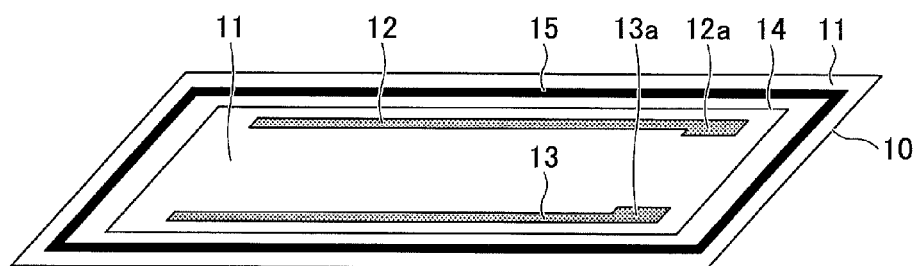
FIGS. 4A and 4B are drawings for explaining the touch panel according to the embodiment.
Figure 4A:
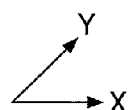
Figure 4B:
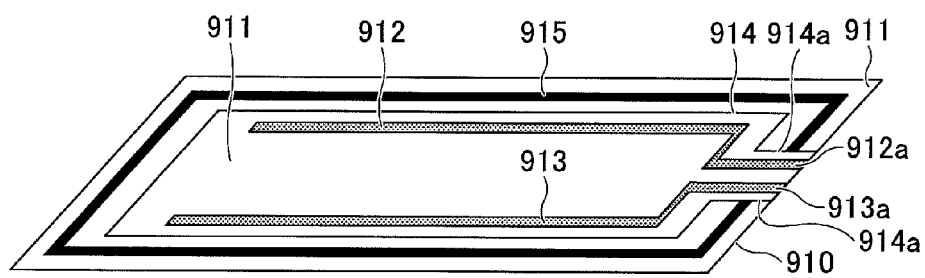
Figure 4B:
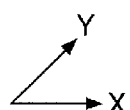

In the following, an advantage of the touch panel according to the present embodiment will be described. FIG. 4A is an oblique perspective view of the upper electrode substrate 10 of the touch panel according to the present embodiment. FIG. 4B is an oblique perspective view of an upper electrode substrate 910 of a touch panel that is illustrated for comparison purposes.

The upper electrode substrate 910 of the touch panel illustrated in FIG. 9B has a transparent conductive film 911 formed thereon similarly to the upper electrode substrate 10 of the present embodiment. The transparent conductive film 911 has two electrodes 912 and 913 formed thereon extending in the X-axis direction and situated near the two opposite sides, respectively, of the upper electrode substrate 910 extending in the X-axis direction. The two electrodes 912 and 913 are formed by screen printing using silver paste similarly to the touch panel of the present embodiment. An electrode interconnection part 912a is formed at one end of the electrode 912 situated toward the positive X-axis direction, and extends toward one of the two opposite sides of the upper electrode substrate 910 extending in the Y-axis direction. An electrode interconnection part 913a is formed at one end of the electrode 913 situated toward the positive X-axis direction, and extends toward one of the two opposite sides of the upper electrode substrate 910 extending in the Y-axis direction.

The transparent conductive film 911 on the upper electrode substrate 910 has a portion thereof removed that is a strip of 1-mm width along the perimeter of a rectangular area enclosing the electrodes 912 and 913, thereby creating a transparent conductive film removed area 914. In the example illustrated in FIG. 4B, however, the transparent conductive film removed area 914 has open ends 914a, which create a gap through which the electrode interconnection parts 912a and 913a of the two electrodes 912 and 913 extend toward a side of the upper electrode substrate 910.

An outer rim electrode 915 is disposed on the transparent conductive film 911 outside the transparent conductive film removed area 914 in such a manner as to surround the transparent conductive film removed area 914. Similarly to the outer rim electrode 15 of the present embodiment, the outer rim electrode 915 is formed by screen printing using silver paste for anti-ESD purposes. The outer rim electrode 915 is formed in such a manner as to surround the transparent conductive film removed area 914. Since the transparent conductive film removed area 914 extends toward a side of the upper electrode substrate 910 extending in the Y-axis direction, however, the outer rim electrode 915 has open ends at the points where the outer rim electrode 915 abuts on the ends 914a of the transparent conductive film removed area 914.

Due to the gap created by the open ends of the transparent conductive film removed area 914 in the touch panel illustrated in FIG. 4B, static electricity may flow into the touch panel along the two electrodes 912 and 913 through the gap of the transparent conductive film removed area 914 situated at one side of the upper electrode substrate 910. Inflow of static electricity into the touch panel along the electrodes 912 and 913 may end up destroying the touch panel.

On the other hand, the transparent conductive film removed area 14 in the touch panel of the present embodiment as illustrated in FIG. 4A forms a closed loop. With this configuration, the inner part of the transparent conductive film 11 having the electrodes 12 and 13 formed thereon is isolated by the transparent conductive film removed area 14 from the outer part of the transparent conductive film 11 having the outer rim electrode 15 formed thereon. This ensures that the transparent conductive film removed area 14 blocks static electricity. Static electricity flows along the outer rim electrode 15 without flowing into the two electrodes 12 and 13 from a side of the upper electrode substrate 10, so that the effect of static electricity entering from a side of the touch panel is removed.

Accordingly, the touch panel of the present embodiment provides a highly effective anti-electrostatic measure at low cost.

Further, although the present invention is not limited to these embodiments, but various variations and modifications may be made without departing from the scope of the present invention.

The present application is based on and claims the benefit of priority of Japanese priority application No. 2014-005433 filed on Jan. 15, 2014, with the Japanese Patent Office, the entire contents of which are hereby incorporated by reference.

What is claimed is:

1. A touch panel, comprising:
    an upper electrode substrate having a transparent conductive film formed thereon;
    a lower electrode substrate having a transparent conductive film formed thereon;
    two electrodes formed on the transparent conductive film of the upper electrode substrate;
    two electrodes formed on the transparent conductive film of the lower electrode substrate;
    an adhesive sheet bonding the upper electrode substrate and the lower electrode substrate to each other such that the transparent conductive film of the upper electrode substrate and the transparent conductive film of the lower electrode substrate face each other;
    a transparent conductive film removed area formed on the upper electrode substrate by removing part of the transparent conductive film of the upper electrode substrate, the transparent conductive film removed area enclosing the two electrodes on the transparent conductive film of the upper electrode substrate; and
    an outer rim electrode formed on the transparent conductive film of the upper electrode substrate in such a manner as to surround the transparent conductive film removed area,
    wherein the transparent conductive film removed area is an electrically insulating area where the transparent conductive film on the upper electrode substrate is removed so as not to conduct electricity, and the electrically insulating area forms a closed loop.

2. The touch panel as claimed in claim 1, wherein the outer rim electrode forms a closed loop.

3. The touch panel as claimed in claim 1, wherein the transparent conductive films are made of material containing tin-doped indium oxide.

4. The touch panel as claimed in claim 1, further comprising a flexible substrate,
wherein the adhesive sheet has two through holes formed therethrough,
wherein the two electrodes of the upper electrode substrate and two interconnection parts disposed on the lower electrode substrate are coupled to each other via through electrodes formed in the two through holes of the adhesive sheet, respectively, and
wherein an electrode terminal formed on a first surface of the flexible substrate is coupled to the outer rim electrode, and electrode terminals formed on a second surface of the flexible substrate are coupled to the two interconnection parts and to other interconnection parts coupled to the electrodes of the lower electrode substrate, respectively.

5. The touch panel as claimed in claim 1, further comprising two flexible substrates,
wherein the adhesive sheet has two through holes formed therethrough,
wherein the two electrodes of the upper electrode substrate and two interconnection parts disposed on the lower electrode substrate are coupled to each other via through electrodes formed in the two through holes of the adhesive sheet, respectively, and
wherein an electrode terminal formed on a surface of one of the two flexible substrates is coupled to the outer rim electrode, and electrode terminals formed on a surface of the other one of the two flexible substrates are coupled to the two interconnection parts and to other interconnection parts coupled to the electrodes of the lower electrode substrate, respectively.

6. The touch panel as claimed in claim 4, wherein the through electrodes are made of conductive adhesive or conductive paste.

* * * * *